March 20, 1956   M. L. EDWARDS, JR   2,738,559
SEALING DEVICES
Filed March 8, 1950
2 Sheets-Sheet 1
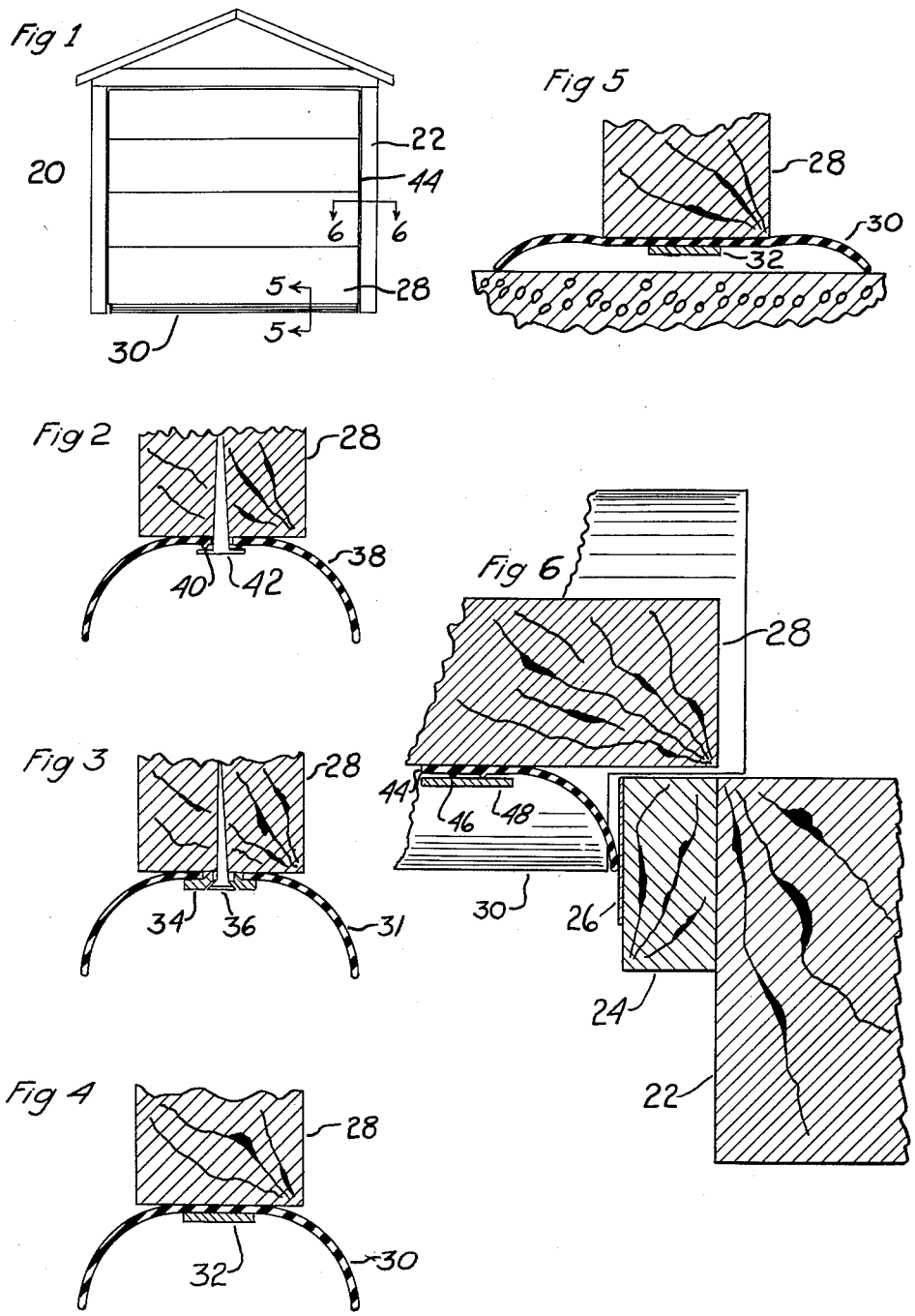
INVENTOR.
BY Morgan L. Edwards Jr.
Rey Eilers
ATTORNEY March 20, 1956  M. L. EDWARDS, JR  2,738,559
SEALING DEVICES
Filed March 8, 1950  2 Sheets-Sheet 2
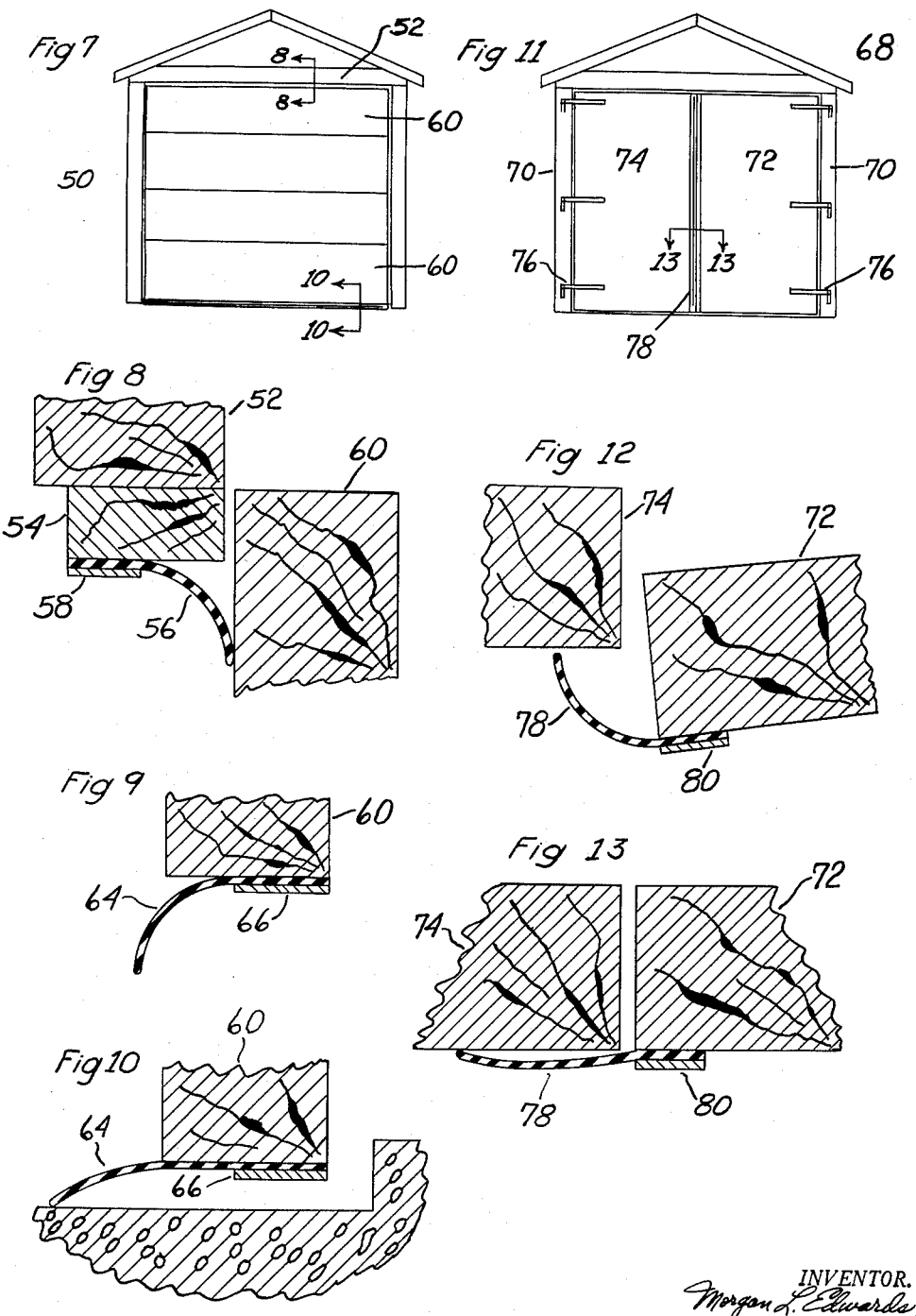
INVENTOR.
Morgan L. Edwards Jr.
BY
Rey Eilers
ATTORNEY

United States Patent Office 2,738,559
Patented Mar. 20, 1956

2,738,559

SEALING DEVICES

Morgan L. Edwards, Jr., St. Louis, Mo.

Application March 8, 1950, Serial No. 148,463

10 Claims. (Cl. 20—69)

This invention relates to improvements in sealing devices. More particularly this invention relates to improvements in sealing devices that can be used to span and seal off the gaps between relatively movable elements.

It is therefore an object of the present invention to provide an improved sealing device that can be used to span and seal off the gap between relatively movable elements.

The problem of spanning and sealing off the gaps between relatively movable elements is not a new one; and many different sealing devices have been proposed or used to effect the desired spanning and sealing off of such gaps. The need of spanning and sealing off gaps between relatively movable elements is quite clear, because unsealed gaps permit warm air to leak out and also permit cold air, dirt and water to enter; but the prior sealing devices have been unable to provide the desired sealing off of those gaps. For example, the strips of felt which have been proposed and used can not span and seal off a wide gap; being able to seal off only very narrow gaps. In addition, the strips of felt are not resistant to water, snow or ice, they tear easily, and they lose their resilience rather quickly. The flexible metal strips that have been proposed and used also are unable to span and seal off large gaps; being restricted to use with narrow gaps only. In addition, the flexible metal strips are unable to accommodate irregular gaps between relatively movable elements, and they are frequently corroded by the action of rain, snow and ice. Rubber strips, of various sizes and configurations, have been proposed and used; but those strips soon developed "compression cracks," lost their "life," and became unable to span and seal off the gaps between relatively movable elements. For these various reasons, prior sealing devices have proved to be objectionable. The present invention obviates these objections by providing a seal which is arcuate and which is made of rubber. Such a seal can span and seal off gaps of varying width, can be resistant to the elements, can avoid "compression cracks," and can maintain its "life." It is therefore an object of the present invention to provide a sealing device that is arcuate and that is made of rubber.

The arcuate sealing device of rubber, that is provided by the present invention, will be used in such a way that it is always arcuate and is always free of right angle bends. Moreover, that seal will be used in such a way that it must flex as the relatively movable elements move into closed position and must also flex as those elements move toward open position. By being arcuate at all times, and by being free of right angle bends at all times, the sealing device provided by the present invention will always be free of "compression cracks." By being forced to flex as the relatively movable elements move into and out of closed position, the sealing device of the present invention has the rubber thereof "worked;" and the "working" of the rubber keeps it "live." It is therefore an object of the present invention to provide an arcuate sealing device of rubber which can be used so it is always arcuate, is always free of right angle bends, and is made to flex as the relatively movable elements move into and out of closed position.

When the relatively movable elements, with which the sealing device provided by the present invention is used, are in open position that sealing device will be in its natural, unstressed condition; and at such time that sealing device will have an arcuate cross section. When those movable elements are in closed position that sealing device will be in its stressed position; but it will still have an arcuate configuration and it will constantly attempt to restore itself to its natural, unstressed condition. As a result, any irregularity in the width of the gap between the relatively movable elements will permit the sealing device to move toward its natural, unstressed condition; and such movement of the sealing device will enable that device to span and seal off any such irregularity. This characteristic of the sealing device provided by the present invention is particularly useful where one of the relatively movable elements is effected by changes in temperature or humidity.

Rubber tends to assume a "permanent set" when left in one position for a considerable period of time. Tendencies toward such "sets" must be minimized in sealing devices, or those devices will become unable to span and seal off the gaps between relatively movable elements. The present invention minimizes the tendency of sealing devices to take "permanent sets" by disposing those sealing devices so gravitational forces can, when the relatively movable elements are in open position, help restore those devices to their unstressed, natural condition. The tendency of the rubber of those sealing devices to take a "set," will be largely overcome by gravitational forces and the natural restorative forces within that rubber. It is therefore an object of the present invention to provide a sealing device of rubber which can be disposed so gravitational forces coact with the natural restorative forces within the sealing device to minimize the tendency of the rubber of that device to take a "permanent set."

It has been found that overhead doors for garages and the like frequently become frozen in closed position; ice that forms at the lower edges of those doors holding those doors solidly against upward movement. To free such doors after they become frozen, it is customary to chip the ice away with a shovel or to inundate the frozen sections of the doors with considerable quantities of hot water. The chipping of the ice frequently leads to marring of the doors, and the use of quantities of hot water can cause scalds. The sealing device provided by the present invention obviates the freezing of overhead doors because it can flex and free itself from the ice. When the door is itself frozen in position, no part of that door can yield; and thus the upward force is distributed along the length of the door and it is insufficient to free the door. Where the sealing device is used, various portions of this sealing device can yield and permit the concentration of heavy forces upon frozen portions of that sealing device; and those concentrations will free those portions. The process will continue until all portions of the sealing device are free. It is therefore an object of the present invention to equip overhead doors with rubber sealing devices.

Other and further objects and advantages of the present invention should become apparent from an examination of the drawing and accompanying description.

In the drawing and accompanying description several preferred embodiments of the present invention are shown and described; but it is to be understood that the drawing and accompanying description are for the purpose of illustration only and do not limit the invention and that the invention will be defined by the appended claims.

In the drawing,

Fig. 1 is a front elevational view of a building which has an overhead door equipped with sealing devices at the top, bottom, and sides thereof; such sealing devices being made in accordance with the principles and teachings of the present invention, Fig. 2 is a cross-sectional, end view of an overhead door equipped at the bottom thereof with another form of sealing device provided by the present invention, Fig. 3 is a cross-sectional, end view of an overhead door equipped at the bottom thereof with still another form of sealing device provided by the present invention, Fig. 4 is a cross-sectional, end view of the overhead door and the bottom sealing device of Fig. 1, Fig. 5 is a cross-sectional, end view of the overhead door and bottom sealing device of Fig. 1, and it is taken along the plane indicated by the line 5—5 in Fig. 1, Fig. 6 is a cross-sectional, plan view of the overhead door, door post, and side sealing device of Fig. 1, and it is taken along the plane denoted by the line 6—6 in Fig. 1, Fig. 7 is a front elevational view of a building which has an overhead door equipped with sealing devices at the top, bottom, and sides thereof; such sealing devices being made in accordance with the principles and teachings of the present invention, Fig. 8 is a cross-sectional, end view of the overhead door, door lintel, and top sealing device of Fig. 7, and it is taken along the plane indicated by the line 8—8 in Fig. 7, Fig. 9 is a cross-sectional, end view of the overhead door and bottom sealing device of Fig. 7, and it shows that door in raised position, Fig. 10 is a cross-sectional, end view of the overhead door and bottom sealing device of Fig. 7, and it is taken along the plane indicated by the line 10—10 in Fig. 7, Fig. 11 is a front elevational view of a building with doors that are hinged at their outer edges and meet at their inner edges, Fig. 12 is a cross-sectional, plan view of the doors of Fig. 11 as they stand ajar, and Fig. 13 is a cross-sectional, plan view of the doors of Fig. 11, and it is taken along the plane indicated by the line 13—13 in Fig. 11.

Referring to the drawing in detail, the numeral 20 generally denotes a building which is equipped with an overhead door 28. That overhead door is formed of a number of individual horizontally disposed sections which are suitably secured together by hinges, not shown. The door 28 is supported by tracks of the usual form and configuration, not shown, and that door can be moved upwardly along those tracks until it is disposed in a horizontal position adjacent the top of the building 20.

The lowest section of the overhead door 28 has an elongated sealing device 30 secured thereto; that sealing device having a flat center section and two downwardly depending arcuate sections. A securing strip 32 of a material which is resistant to the action of weather, as for example stainless steel, is disposed beneath the flat center section of the sealing device 30, and that plate 32 has openings therethrough which receive screws or nails, not shown. The securing plate 32 will extend along the length of the bottom section of the overhead door 28 and it will hold the sealing device 30 in intimate engagement with the bottom surface of the lowest section of the overhead door 28.

The sealing device 30 is of preformed natural or synthetic rubber and its natural unstressed condition is illustrated in Fig. 4. In that condition, the arcuate depending edges of the sealing device 30 extend downwardly in gently rounded curves. In one preferred form of the invention, the sealing device 30 is five thirty seconds ($5/32$) of an inch thick, and the arcuate depending edges have inner radii of one (1) inch and outer radii of one and five thirty seconds ($1\ 5/32$) of an inch. The sealing device 30 will resist all forces tending to deform that sealing device out of the natural unstressed condition illustrated in Fig. 4, but the material of which the sealing device 30 is made will be flexible enough that the sealing device 30 can be so deformed.

In Fig. 5, the sealing device 30 is shown as it will be deformed when the overhead door 28 is in closed position. At such time the arcuate depending edges of the sealing device 20 will still be arcuate in form and configuration, although the curvature of those edges will be appreciably less. The resilience of the downwardly depending side edges of the sealing device 30 will be great enough that those side edges will maintain an arcuate configuration when the overhead door 28 is in closed position and those edges will actually extend a slight distance above the lower edge of the lowest section of the overhead door 28. The outer edges of the sealing device 30 will press against the concrete floor and form two spaced seals with that floor. This is very desirable because it traps a quantity of dead air between those seals, and that quantity of dead air will act as a body of insulation to resist the transfer of heat from one side of the door 28 to the other. In addition, those seals will prevent wind, dust, and rain from being driven under the door 28.

When the overhead door 28 is moved to open position, as shown in Fig. 4, gravitational forces on the sealing device 30 will coact with the natural restorative forces within that sealing device to cause the downwardly depending arcuate edges of that sealing device to move to the natural, unstressed condition of that sealing device. Consequently, any tendency of the downwardly depending arcuate edges of the sealing device 30 to assume a "permanent set" while the overhead door 28 is in closed position, as shown in Fig. 5, will be resisted and overcome by the gravitational and restorative forces acting upon that sealing device when it is in open position. In addition, the fact that the sealing device 30 must flex as the overhead door 28 moves to closed position and again flexes when that overhead door moves out of closed position causes "working" of the rubber in that sealing device. This "working" of the rubber in the sealing device 30 keeps that rubber "live" and avoids hardening and weakening of that rubber.

In changing from the natural, unstressed condition shown in Fig. 4 to the stressed condition shown in Fig. 5, the side edges of the sealing device 30 experience a change of curvature. However, that change of curvature is limited to less than ninety (90) degrees. As the result, there is not a great deal of pressure exerted within the sealing device 30 when it is in stressed condition, and thus very little "fatiguing" of the rubber in that sealing device occurs. In addition, when the sealing device 30 is in that condition, it does not have a right angle bend in it, and thus the rubber of that sealing device will not develop "compression cracks." For these various reasons, the sealing device 30 provided by the present invention will have a long life.

In the event the device were to be used in extremely cold climates, as for example climates where the temperatures were found to go below forty five (45) degrees Fahrenheit below zero, the depending edge of the sealing device 30 which extended outwardly of the door might temporarily lose some of its resilience due to the cold. However, such loss of resilience would not interfere with the effective sealing action of sealing device 30 because that outer edge of the sealing device 30 would not assume a curvature less than that enforced upon it by contact with the ground and would be able to return to that curvature and engage the ground whenever the overhead door 28 was in closed position. In addition, the inner edge of the sealing device 30 would be virtually unaffected by the cold temperatures exteriorly of the overhead door 28 because of the dead air that is caught between the edges of the sealing device 30 and thus have enough resilience to positively prevent the entry of wind as well as cold air. For these reasons, the sealing device 30 provided by the present invention can operate effectively irrespective of the temperatures it experiences in use. In addition, the sealing device 30 is very useful in prevenitng freezing of the overhead door 28 to the concrete base adjacent which it is used. In the absence of the sealing device 30, the lower edge of the lowermost section of the overhead door 28 can easily freeze to the concrete base. The problem of freeing that frozen lowermost section is a serious one and usually entails chipping away of the ice or the use of large quantities of hot water to melt that ice. All such freezing is obviated by use of the sealing device 30 since that sealing device can yield as upward forces are impressed upon the overhead door 28 and those forces will result in the concentration of a number of heavy forces at points along the length of the sealing device 30; and those heavy forces will pull those portions of the sealing device 30 away from the ice. The yielding of those particular portions of the sealing device 30, and the subsequent freeing of other portions of the sealing device 30 eventually lead to complete freeing of the sealing device 30 from the ice without any need of chipping away the ice or of melting that ice with hot water.

Fig. 2 shows a sealing device 38 attached to the overhead door 28, and the sealing device 38 is largely similar to the sealing device 30 of Figs. 1, 4 and 5. The principal difference between the sealing devices 30 and 38 is the provision on the sealing device 38 of narrow, elongated ribs 40 adjacent the center of that sealing device. These elongated ribs 40 will be disposed on opposite sides of openings formed at the center of the sealing device 38 and those ribs will minimize and prevent the formation of tears which extend from those openings outwardly into the downwardly depending edges of the sealing device 38. The openings will receive nails 42 or screws which seat in the door 28.

Fig. 3 shows another form of sealing device and that sealing device is denoted by the numeral 31. The sealing device 31 is almost identical to the sealing device 30 of Figs. 1, 4 and 5, but it is secured to the overhead door 28 in a slightly different manner. A number of circular washers 34 with countersunk centers are used to surround nails 36 or screws and distribute the force of the nails or screws to the sealing device 31. The washers perform, individually, the functions performed all along the length of the sealing device by the securing plate 32 in Figs. 4 and 5; and that function is to distribute the force exerted by the nails or screws on the sealing device. A more complete and uniform distribution of force is attained by use of the securing plate 32, but the use of a number of individual washers 34 and nails 36 makes installation simpler and easier.

The various sealing devices 30, 31 and 38 are all securable to the bottom of the lowermost section of overhead doors and they will act in the same way to provide a double seal for that overhead door. That double seal will be held securely by the gravitational and restorative forces on the securing devices, as shown particularly in Fig. 5. The combined effect of the gravitational and restorative forces is to provide spaced seals that exclude wind, rain, snow, ice and dirt. In the event the concrete base is not level or in the event irregularities are found in that concrete, the flexibility and resiliency of the sealing devices 30, 31 and 38 will enable those devices to fit and span those irregularities. This is in sharp contrast to flexible metal sealing strips previously used; such flexible metal sealing strips being unable to fill irregularities in the gap between relatively movable elements.

The various sections of the overhead door 28 carry vertically directed sealing devices 44, and those sealing devices are secured to those sections of the overhead door 28 by a securing plate 48. This securing plate bears against elongated ribs 46 on the surface of the sealing devices 44 and is held in intimate engagement with those ribs by nails or screws, not shown. The sealing devices 44 are at the opposite ends of the various sections of the overhead door 28 and their free edges bear against anti-friction plates 26 held on closure strips 24 which are secured to the door post 22. The anti-friction plates 26 are coated with a graphite paint to reduce the friction between the free edges of the sealing devices 44 and the plates 26. The sealing devices 44 are arcuate in cross-section and have, in their natural, unstressed condition, a curvature slightly less than that shown in Fig. 6. As the result, when the sealing devices 44 are in stressed condition, as shown in Fig. 6, they tend to move toward their natural, unstressed condition; and in doing so press tightly against the anti-friction plate 26. In doing so, the sealing devices 44 provide a tight seal with the door post 22, that will exclude wind, dirt, rain, snow and ice.

The upper end of the anti-friction plate 26 will be bent outwardly so it can act to provide a gradually increasing curvature to the sealing devices 44 as those devices approach the stressed conditions shown in Fig. 6. As the sealing devices move away from the anti-friction plate 26 during movement of the overhead door 28, those sealing devices will tend to move to their natural, unstressed conditions. As they do so, gravity will help them move to their natural, unstressed condition because those sealing devices will be disposed with their free edges extending upwardly when the overhead door is in its upper position. As the result, gravitational forces and the natural restorative forces within the sealing devices 44 will tend to prevent those sealing devices from taking a "permanent set" when they are in stressed condition. In addition, the flexing of those sealing devices as the overhead door moves into and out of closed position will "work" the rubber in those sealing devices and thus keep that rubber "live."

Fig. 8 shows a sealing device 56 which is secured to a closure strip 54 on the lintel 52 of a building 50 by a securing plate 58 and nails or screws, not shown. That sealing device is arcuate in form and it has a natural, unstressed condition wherein its curvature is slightly less than that shown in Fig. 8. In its stressed condition, as shown in Fig. 8, the sealing device 56 presses against the uppermost section of the overhead door 60. In doing so, the sealing device 56 provides a seal which will exclude, air, dust, rain, snow and ice. A sealing device similar to the sealing device 56 in Fig. 8 will be provided for the building denoted by the numeral 20 in Fig. 1. The building of Fig. 1 will then have a sealing device for the top, both sides, and the bottom thereof. As a result, the overhead door 28 will coact with its sealing devices to positively exclude dust, air, rain, snow and ice.

Fig. 9 shows a sealing device 64 secured to the lowermost section of the overhead door 60 by a securing plate 66. The securing device 64 is equivalent to the center and outermost portion of the sealing device 30 of Figs. 4 and 5. The sealing device 64 is preferred where the concrete base adjacent which the overhead door must work has a "nosing," such as shown in Fig. 10. In its natural and unstressed condition, as shown in Fig. 9, the sealing device 64 will have an arcuate configuration of about ninety (90) degrees. In its stressed condition, as shown in Fig. 10, that sealing device will have a curvature of considerably less amount. In its stressed condition, as shown in Fig. 10, the sealing device 64 will have its outer edge pressing firmly against the concrete base and will effectively prevent the passage of wind, rain, snow or ice. When the overhead door 60 is raised upwardly, gravitational forces will coact with the restorative forces within the sealing device 64 to return that sealing device to its natural, unstressed condition. In this way, the sealing device 64 will be deterred from taking a "permanent set." In addition, the flexing of the sealing device 64 as the overhead door 60 moves into and out of closed position, will "work" the rubber in that sealing device and will keep that rubber "live."

Although not specifically illustrated in the drawing, a sealing device similar to the sealing device 44 of Fig. 6 will be provided at each side of the overhead door 60 of Fig. 7. Such sealing devices will coact with the sealing devices 56 and 64 to effectively prevent the entrance of wind, rain, snow and ice into the building 50 shown in Fig. 7.

In Fig. 11, the numeral 68 generally denotes a building which has doors 72 and 74 supported at their edges. Those doors are held by hinges 76 and they can be swung open or swung into closed position. The free edge of the door 72 carries a sealing device 78, and that sealing device is secured to the free edge of that door by a securing plate 80. Nails or screws, not shown, will extend through the securing plate 80, through the sealing device 78 and into the door 72 to maintain that sealing device in assembled relation with that door. The sealing device has, in its natural, unstressed condition, a curvature of about ninety (90) degrees, as shown in Fig. 12. When in its stressed condition, as shown in Fig. 13, that sealing device has a curvature of considerably less amount. In its stressed condition, as shown in Fig. 13, the sealing device 78 will still be arcuate in cross section and its free edge will press against the front surface of the door 74. In doing so, that edge of the sealing device 78 will prevent the entrance of wind, rain, snow and ice.

As the door 72 moves away from the door 74, the natural restorative forces within the sealing device 78 will cause that sealing device to return to its natural, unstressed condition. In addition, gravitational forces will act upon the free edge of that sealing device 78 and tend to cause that sealing device to return to its natural, unstressed condition. As a result, the sealing device 78 will not be permitted to take a "permanent set." In addition, the flexing of the sealing device 78 as the door 72 moves into and out of engagement with the door 74, will "work" the rubber in the sealing device 78, and such "working" of that rubber will keep that rubber "live." Although not shown particularly in the drawing, a sealing device similar to the sealing device 56 of Fig. 8 will be secured to the closure strip on the lintel of the building 68 shown in Fig. 11. In addition, a sealing device similar to the sealing device 64 of Figs. 9 and 10 will be secured to the bottom of the doors 72 and 74. That sealing device will tend to be bent under as the doors 72 and 74 are moved to open position, but that sealing device will be restored to a position similar to that shown with sealing device 64 in Fig. 10, whenever the doors 72 and 74 are moved to closed position. These sealing devices will then provide complete protection against the entry of wind, rain, snow and ice.

Whereas several preferred embodiments of the present invention have been shown and described in the drawing and accompanying description it should be apparent to those skilled in the art that various changes may be made in the form of the invention without affecting the scope thereof.

What I claim is:

1. A sealing device that is adapted to span the gap between two relatively movable elements and that comprises an elongated strip of unstressed resilient material, said sealing device being of substantially constant thickness, said sealing device having an elongated, substantially flat, narrow securing portion that is securable to one face of one of said two relatively movable elements and having an elongated free edge that is engageable with one face of the other of said two elements whenever said elements are adjacent each other, whereby said sealing device spans said gap between said elements whenever said elements are adjacent each other, said free edge being connected to said securing portion by an intermediate yieldable elongated unstressed arcuate section that is wider than said securing portion, said securing portion being approximately tangential to said intermediate yieldable elongated unstressed arcuate section, said securing portion being generally parallel to the said one face of said other element as said elements move relative to each other, said intermediate yieldable elongated arcuate section holding said free edge approximately normal to and directed toward said one face of said other element as said elements move relative to each other, said intermediate yieldable elongated arcuate section yielding to accommodate variations in the said gap between said relatively movable elements and thereby maintain a seal despite said variations, said free edge of said sealing device engaging the said face of said other of said elements to hold the remainder of said sealing device out of engagement with said face of said other of said elements whenever said elements are adjacent each other, whereby substantially all portions of said unstressed arcuate intermediate section are able to exert sealing pressure on said free edge, said securing portion and said arcuate intermediate section and said free edge defining a smooth and continuous arc of approximately ninety degrees.

2. A sealing device that comprises an elongated strip of unstressed resilient material, said sealing device having an elongated narrow securing portion that is securable to one of two relatively movable elements and having an elongated free edge that is engageable with the other of said elements whenever said elements are adjacent each other, whereby said sealing device spans said elements whenever said elements are adjacent each other, said free edge being connected to said securing portion by an intermediate yieldable elongated unstressed arcuate section, said free edge of said sealing device engaging the other of said elements to hold the remainder of said sealing device out of engagement with said other of said elements whenever said elements are adjacent each other, whereby substantially all portions of said unstressed arcuate intermediate section are able to exert sealing pressure on said free edge, said securing portion and said arcuate intermediate section and said free edge defining a smooth and continuous arc, said securing portion having narrow elongated raised ribs that are spaced apart to receive fastening elements therebetween and thereby minimize tearing of said sealing device.

3. A sealing device that is carried by an overhead door and that comprises an elongated strip of unstressed resilient material, said sealing device being of substantially constant thickness, said sealing device having an elongated, substantially flat, narrow securing portion that is securable to one face of one of two relatively movable elements and having two elongated free edges that are engageable with one face of the other of said elements whenever said elements are adjacent each other, whereby said sealing device spans said elements whenever said elements are adjacent each other, said free edges being connected to said securing portion by intermediate yieldable elongated unstressed arcuate sections that are each wider than said securing portion, said free edges of said sealing device engaging the said face of said other of said elements to hold the remainder of said sealing device out of engagement with said face of said other of said elements whenever said elements are adjacent each other, whereby substantially all portions of said unstressed arcuate intermediate sections are able to exert sealing pressure on said free edges, one of said free edges and one of said intermediate sections and said securing portion and the other of said intermediate sections and the other of said free edges defining a smooth and continuous arc of approximately one hundred and eighty degrees.

4. A sealing device that is carried by an overhead door and that comprises an elongated strip of unstressed resilient material, said sealing device having an elongated, substantially flat, narrow securing portion that is securable to one of two relatively movable elements and having two elongated free edges that are engageable with the other of said elements whenever said elements are adjacent each other, whereby said sealing device spans said elements whenever said elements are adjacent each other, said free edges being connected to said securing portion by intermediate yieldable elongated unstressed arcuate sections, said free edges of said sealing device engaging the other of said elements to hold the remainder of said sealing device out of engagement with said other of said elements whenever said elements are adjacent each other, whereby substantially all portions of said unstressed arcuate intermediate sections are able to exert sealing pressure on said free edges, one of said free edges and one of said intermediate sections and said securing portion and the other of said intermediate sections and the other of said free edges defining a smooth and continuous arc of approximately one hundred and eighty degrees, the gravitational forces on said sealing device coacting with restorative forces within said sealing device to return said sealing device to natural unstressed condition.

5. A sealing device that comprises an elongated strip of unstressed resilient material, said sealing device having an elongated substantially flat, narrow securing portion that is securable to one face of one of two relatively movable elements and having an elongated free edge that is engageable with one face of the other of said elements whenever said elements are adjacent each other, whereby said sealing device spans said elements whenever said elements are adjacent each other, said free edge being connected to said securing portion by an intermediate yieldable elongated unstressed arcuate section that is wider than said securing portion, said securing portion being approximately tangential to said intermediate yieldable elongated unstressed arcuate section, said securing portion being generally parallel to the said one face of said other element as said elements move relative to each other, said intermediate yieldable elongated unstressed arcuate section holding said free edge approximately normal to and directed toward said one face of said other element as said elements move relative to each other, said free edge of said sealing device engaging the said face of said other of said elements to hold the remainder of said sealing device out of engagement with said face of said other of said elements whenever said elements are adjacent each other, whereby substantially all portions of said elongated arcuate intermediate section are able to exert a sealing pressure on said free edge.

6. A sealing device that is adapted to span the gap between two relatively movable elements and that comprises an elongated strip of unstressed resilient material, said sealing device having an elongated substantially flat, narrow securing portion that is securable to one face of one of two relatively movable elements and having an elongated free edge that is engageable with one face of the other of said elements whenever said elements are adjacent each other, whereby said sealing device spans said gap between said elements whenever said elements are adjacent each other, said free edge being connected to said securing portion by an intermediate yieldable elongated unstressed arcuate section that is wider than said securing portion, said securing portion being generally parallel to the said one face of said other element as said elements move relative to each other, said intermediate yieldable elongated unstressed arcuate section holding said free edge directed toward said one face of said other element as said elements move relative to each other, said intermediate yieldable elongated unstressed arcuate section yielding to accommodate variations in the said gap between said relatively movable elements and thereby maintain a seal despite said variations, said free edge of said sealing device engaging the said face of said other of said elements to hold the remainder of said sealing device out of engagement with said face of said other of said elements whenever said elements are adjacent each other, whereby substantially all portions of said elongated arcuate intermediate section are able to exert sealing pressure on said free edge.

7. A sealing device that comprises an elongated strip of unstressed resilient material, said sealing device having an elongated securing portion that is securable to one face of one of two relatively movable elements and having an elongated free edge that is engageable with one face of the other of said elements whenever said elements are adjacent each other, whereby said sealing device spans said elements whenever said elements are adjacent each other, said free edge being connected to said securing portion by an intermediate yieldable elongated unstressed arcuate section, said securing portion being approximately tangential to said intermediate yieldable elongated unstressed arcuate section, said securing portion being generally parallel to the said one face of said other element as said elements move relative to each other, said intermediate yieldable elongated unstressed arcuate section holding said free edge approximately normal to and directed toward said one face of said other element as said elements move relative to each other, said free edge of said sealing device engaging the said face of the said other of said elements to hold the remainder of said sealing device out of engagement with said face of said other of said elements whenever said elements are adjacent each other, whereby substantially all portions of said elongated arcuate intermediate section are able to exert sealing pressure on said free edge, said securing portion and said arcuate intermediate section and said free edge defining a smooth and continuous arc.

8. A sealing device that is adapted to span the gap between two relatively movable elements and that comprises an elongated strip of unstressed resilient material, said sealing device having an elongated securing portion that is securable to one face of one of said two relatively movable elements and having an elongated free edge that is engagable with one face of the other of said two elements whenever said elements are adjacent each other, whereby said sealing device spans said gap between said elements whenever said elements are adjacent each other, said free edge being connected to said securing portion by an intermediate yieldable elongated unstressed arcuate section, said securing portion being approximately tangential to said intermediate yieldable elongated unstressed arcuate section, said intermediate yieldable elongated unstressed arcuate section holding said free edge directed toward said one face of said other element as said elements move relative to each other, said intermediate yieldable elongated arcuate section yielding to accommodate variations in the gap defined by said relatively movable elements and thereby maintain a seal despite said variations, said free edge of said sealing device engaging the said face of said other of said elements to hold the remainder of said sealing device out of engagement with said face of said other of said elements whenever said elements are adjacent each other, whereby substantially all portions of said elongated arcuate intermediate section are able to exert sealing pressure on said free edge.

9. A sealing device that is adapted to span the gap between two relatively movable elements and that comprises an elongated strip of unstressed resilient material, said sealing device having an elongated securing portion that is securable to one face of said two relatively movable elements and having an elongated free edge that is engageable with one face of the other of said two elements whenever said elements are adjacent each other, whereby said sealing device spans said gap between said elements whenever said elements are adjacent each other, said free edge being connected to said securing portion by an intermediate yieldable elongated unstressed arcuate section, said securing portion being approximately tangential to said intermediate yieldable elongated unstressed arcuate section, said intermediate yieldable elongated unstressed arcuate section holding said free edge directed toward said one face of said other element as said elements move relative to each other, said intermediate yieldable elongated arcuate section yielding to accommodate variations in the gap defined by said relatively movable elements and thereby maintain a seal despite said variations, said free edge of said sealing device engaging the said face of said other of said elements to hold the remainder of said sealing device out of engagement with said face of said other of said elements whenever said elements are adjacent each other, whereby substantially all portions of said elongated arcuate intermediate section are able to exert sealing pressure on said free edge, said securing portion and said elongated arcuate intermediate section and said free edge defining an arc of approximately ninety degrees, said elongated arcuate intermediate section flexing less than ninety degrees as said elements move relative to each other.

10. A sealing device that is adapted to span the gap between two relatively movable elements and that comprises an elongated strip of unstressed resilient material, said sealing device having an elongated securing portion that is securable to one face of one of said two relatively movable elements and having two elongated free edges that are engageable with one face of the other of said two elements whenever said elements are adjacent each other, whereby said sealing device spans said gap between said elements whenever said elements are adjacent each other, said free edges being connected to said securing portion by intermediate yieldable elongated unstressed arcuate sections, said securing portion being approximately tangential to said intermediate yieldable elongated unstressed arcuate sections, said intermediate yieldable elongated unstressed arcuate sections holding said free edges directed toward said one face of said other element as said elements move relative to each other, said intermediate yieldable elongated arcuate sections yielding to accommodate variations in the gap defined by said relatively movable elements and thereby maintain a seal despite said variations, said free edges of said sealing device engaging the said face of said other of said elements to hold the remainder of said sealing device out of engagement with said face of said other of said elements whenever said elements are adjacent each other, whereby substantially all portions of said elongated arcuate intermediate sections are able to exert sealing pressure on said free edges, said securing portion and said intermediate sections and said free edges defining an arc of approximately one hundred and eighty degrees.

References Cited in the file of this patent

UNITED STATES PATENTS

| 1,081,692 | Newpher | Dec. 16, 1913 |
| 1,953,592 | Deniston, Jr. | Apr. 3, 1934 |
| 2,070,373 | Schwab | Feb. 9, 1937 |
| 2,294,101 | Tripp | Aug. 25, 1942 |
| 2,294,792 | Miller | Sept. 1, 1942 |
| 2,552,752 | Venditty | May 15, 1951 |

FOREIGN PATENTS

| 203,013 | Switzerland | May 16, 1939 |